(No Model.)
O. J. SCHRAMM.
CAMERA SHUTTER.
No. 504,425. Patented Sept. 5, 1893.
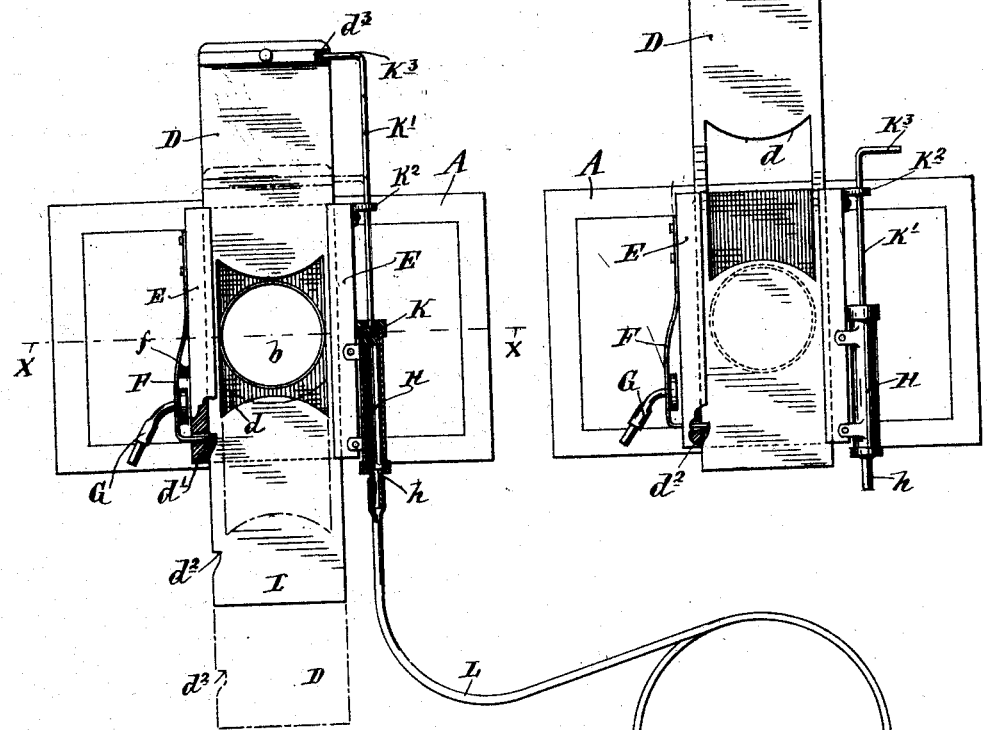
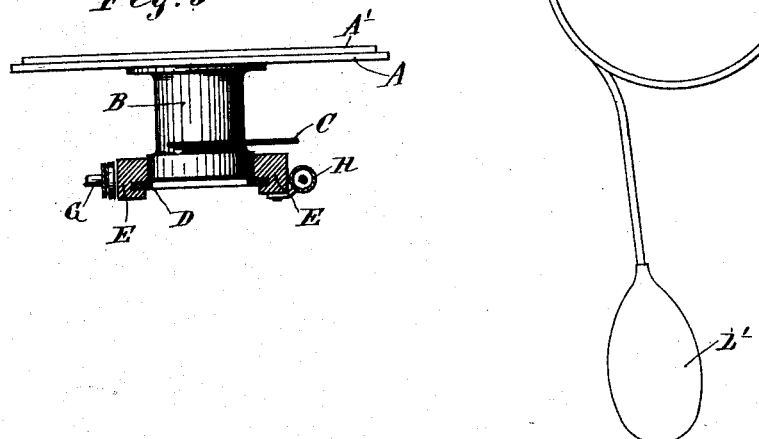
Witnesses.
A. H. Opsahl
E. F. Elmore
Inventor.
Oscar J. Schramm
By his Attorney.
Jas. F. Williamson

UNITED STATES PATENT OFFICE.

OSCAR J. SCHRAMM, OF MINNEAPOLIS, MINNESOTA.

CAMERA-SHUTTER.

SPECIFICATION forming part of Letters Patent No. 504,425, dated September 5, 1893.

Application filed March 3, 1893. Serial No. 464,498. (No model.)

*To all whom it may concern:*

Be it known that I, OSCAR J. SCHRAMM, a citizen of the United States, residing at Minneapolis, in the county of Hennepin and State of Minnesota, have invented certain new and useful Improvements in Camera-Shutters; and I do hereby declare the following to be a full, clear, and exact description of the invention, such as will enable others skilled in the art to which it appertains to make and use the same.

My invention is in the nature of an attachment for controlling a drop shutter for cameras, with a view of manipulating the drop shutter for time work, and enabling the operator to include himself as an object in the picture.

My device and its application are illustrated in the accompanying drawings.

Therein like letters refer to like parts.

Figure 1 is a front elevation of a camera equipped with my invention, some parts being shown in section and others broken away. Fig. 2 is a similar view, with the shutter in a different position, and the air bulb and tube detached. Fig. 3 is a view, partly in plan and partly on the line X X of Fig. 1.

A A' are respectively the front and back of the lens board of a camera, (not shown.)

B is the lens tube, $b$ the lens, C the rotary stop, D the drop shutter, and E the shutter guide, all of the well known standard construction. The shutter guide is supported on the outer end of the lens tube in a vertical position, and the shutter works freely therein and is of the usual construction with the central opening $d$, and pair of notches $d'$ and $d^2$ on one margin adapted to be engaged by a spring latch or detent F, to secure the shutter in either one of two different positions. The spring latch F is equipped with an air trip G of the ordinary kind, used for instantaneous work.

To the standard camera, above described, constructed for instantaneous work, I make my attachment, the parts of which are as follows: H is an air cylinder, with an open or perforated top and secured as shown to the shutter guide E; K is a piston fitting said cylinder, and provided with an extended stem K' working through a keeper $K^2$ and having its upper end bent at right angles to form a projection $K^3$ which is detachably engageable with a recess or seat $d^3$ in the upper end of the shutter. The lower end of the cylinder H is provided with a nipple or tubular extension $h$, adapted to receive the tube L of a hand bulb L'. The tube L is flexible and is of a length of about thirty feet, sufficient to enable the operator to manipulate the shutter by the hand bulb L' and the air motor H K, while including himself as an object in the picture.

The operation of the device is obvious from an inspection of the drawings. Referring to Fig. 1, the normal position of the shutter is shown in dotted lines. When it is desired to use the shutter for time work, the stem K' of the piston K is engaged with the shutter as shown in Fig. 1, and detent F is rendered inactive by a stop block $f$, or in any other suitable way. The cylinder H of the air motor is of a length to give to the piston a stroke sufficient to bring the opening of the shutter directly in front of the lens. Supposing the shutter to be in its normal or idle position, as shown in dotted lines, the operator has only to compress the hand bulb L', when the shutter will be instantly raised by the action of the motor into its open position, as shown in full lines in Fig. 1; on then releasing the hand bulb the shutter will drop into its original or normal position. The advantage is that the operator can time the device to a nicety, so as to give the proper exposure, and from a distant point, as before stated, sufficiently remote to enable him to take his own picture, if he should so desire. As the opening or closing of the shutter depends simply on the compression or release of the hand bulb L', the control is complete and instantaneous. If it should be desired to use the camera for instantaneous work, the piston stem K' is detached from the shutter, as shown in Fig. 2, the stop block $f$ is removed, rendering the spring latch F active, and the air bulb L' and tube L are applied to the air trip G. The normal position of the shutter will then be as shown in Fig. 2; and on the compression of the bulb the air trip G will release the latch F from the shutter, allowing the same to drop by gravity, giving exposure only while the shutter opening $d$ is passing the lens. This is, of course, the well known action of the drop shutter camera for instantaneous work.

With my attachment, it is obvious from the foregoing description, that the drop shutter camera is given an increased range of work adapting the same for time as well as instantaneous action, and a shutter controller is provided, which is extremely sensitive and efficient, and which enables the operator, as hitherto stated, to include himself as an object in the picture.

What I claim, and desire to secure by Letters Patent of the United States, is as follows:

1. The combination with a camera drop shutter having a spring latch or detent and an air trip, for instantaneous work, of an air cylinder fixed to a stationary part, having a piston with extended stem detachably connectible with the shutter, for time work, and an air bulb with extended flexible tube interchangeably applicable either to the said cylinder or to the said air trip, substantially as and for the purposes set forth.

2. The combination with the drop shutter D having the recess or seat $d^3$ of the cylinder H having the nipple or tube $h$, the piston K having the extended stem K′ with angular projection $K^3$ detachably engageable with the shutter seat $d^3$, and the air bulb L′ and flexible tube L, substantially as and for the purposes set forth.

In testimony whereof I affix my signature in presence of two witnesses.

OSCAR J. SCHRAMM.

Witnesses:
 JAS. F. WILLIAMSON,
 FRANK D. MERCHANT.